June 11, 1963  J. W. LEHDE, JR., ET AL  3,092,859
TAP STOP DEVICE
Filed Feb. 5, 1960

Inventors.
John W. Lehde, Jr. &
Nicholas Hertelendy.
By Brown, Jackson, Boettcher & Dienner
Attys.

3,092,859
TAP STOP DEVICE
John W. Lehde, Jr., and Nicholas Hertelendy, Chicago, Ill., assignors to Scully-Jones and Company, Chicago, Ill., a corporation of Illinois
Filed Feb. 5, 1960, Ser. No. 6,997
5 Claims. (Cl. 10—129)

The present invention relates to adjustable tap stop means for limiting the depth to which a tap may thread a bore, or in other words for limiting the effective length of the tap.

It often happens that the depth of a bore and the depth to which the bore is to be tapped must be limited because otherwise an inner surface of a workpiece section would be penetrated or too closely approached, as in the cases of thin wall sections and valve seats. Similarly, it is important in the tapping of workpieces to receive the taper-threaded ends of pipes that the depth of threading from the work surface into which the hole is threaded be the same for the same pipe size, regardless of any differences in the thickness of the workpieces. Means for limiting the depth to which the thread is carried, as well as means for controlling bore depth, are known, but have certain drawbacks or defects. For example, one type of prior stop means employs a stop member on the tap requiring disassembly in order to allow adjustment. In addition, such prior tap stop means in general are employable each with only one size and style or type of tap.

The present invention provides an improved tap stop device which removes such defects of earlier stop means, being readily adjustable to selectively vary the depth of thread tapping, and easily applied to and removed from the tap apparatus without the need for any disassembly or reassembly thereof or any complicated manipulation of parts. Even more important is the fact that a stop for one size of tap, for example ½–13, may be used with any style of tap of that size, regardless of the number of flutes in the tap, or of variations in the flute cross sections, or of whether the flutes are straight or spiral. While the tap stop device of the present invention is primarily intended for use with a release torque tap driver, it is equally well adapted to use with other types of releasing tap drivers, including manual tap driving means.

It is accordingly an object of the invention to provide a tap stop device which may be employed with all types of taps of the same size, regardless of variations in the tap flutes or the like.

Another object of the invention is the provision of a tap stop device which is readily applied to and removed from the tapping apparatus.

Another object is the provision of a tap stop device which provides accurate and positive control of the depth of tap.

Another object is the provision of a tap stop which may easily be selectively adjusted to afford different depths of tapped holes.

It is also an object of the invention to provide a tap stop device which requires no disassembly in order to change the adjustment thereof.

A further object is the provision of a tap stop device which may be employed with any type of tap driving means.

Other and further objects, advantages, and features of the invention will be apparent to those skilled in the art from the following detailed description thereof, taken in conjunction with the accompanying drawings, in which.

Figure 3:
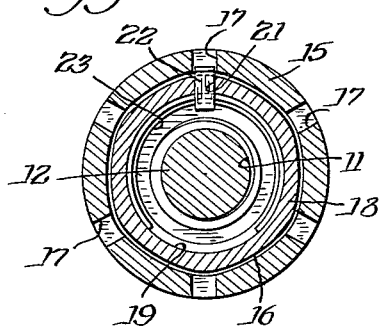
FIG. 3 is a cross-sectional view taken substantially as indicated by the line 3—3 of FIG. 2.
Figure 4:
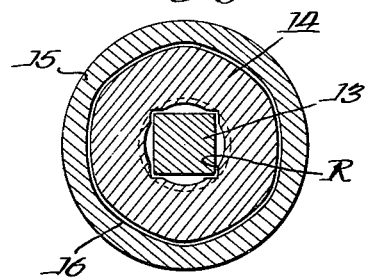
FIG. 4 is a cross-sectional view taken substantially as indicated by the line 4—4 of FIG. 2.

Referring to the drawings, there is shown a tap stop device comprising a nut member 10 which has an axial bore 11 threaded to correspond to the threading of the threaded portion 12 of a tap the shank portion 13 of which is secured in a driving socket 14 by any suitable means, not shown. The socket 14 is of non-circular cross section, in this case of somewhat rounded hexagonal form, as best shown in FIG. 4, which also illustrates a recess R opening from one end of the socket for reception of the tap shank. At this one end, the socket receives the tap, and at the other is connected to tap driving means indicated at D. Slidably disposed on the socket 14 is a sleeve 15 the outer surface of which may be cylindrical or of any other desired configuration, and the interior surface of which corresponds substantially to the cross section or exterior surface of the socket 14, as best evident from FIGS. 3 and 4, a slight clearance 16 being provided between the sleeve and the socket. In the marginal portion of the sleeve 15 adjacent the nut member 10 is provided a plurality of radially extending circumferentially spaced apertures 17, for a purpose explained hereinafter.

The end portion 18 of the nut member 10 adjacent and opposed to the end of the socket 14 is reduced and shaped to conform in size and exterior conformation to the cross section or exterior surface of the socket 14, so that it may be received in the interior of the sleeve 15; and has a counterbore 19 therein, between which and the outer surface of the reduced portion 18 there is defined an annular longitudinally extending flange or wall portion. A shoulder 20 facing the socket 14 is defined on the nut member by the reduced end portion 18. Extending radially through the annular flange or wall is an aperture or bore 21 which is spaced longitudinally from the shoulder 20 by a distance not less than the spacing of the aperture 17 from the adjacent end of the sleeve 15. Slidably disposed in the bore 21 is a retaining pin 22 of a length sufficient to project both inwardly and outwardly of the flange or wall of the end portion 18 and having passed through its inner end a spring 23 in the form of a split resilient ring which is engaged in an annular groove 24 formed in the inner face of the flange or wall portion of the end portion 18. The split spring ring 23 is so formed that when confined in the groove 24 it urges the pin 22 outwardly through the bore 21, so that a nose portion of the pin projects outwardly of the exterior face of the end portion 18. The projecting or nose portion of the pin is formed with a slightly angled end surface or bevel, as indicated at 25, and the adjacent end of the sleeve 15 is also provided with a bevel 26 extending between the inner surface thereof and the end edge.

When it is desired to limit the depth to which a tap will thread a bore, the sleeve 15 is slipped onto the socket 14, and the nut member 10 is then engaged on the tap and rotated to bring it to the desired position on the threaded tap portion 12, at the distance from the end of the tap which corresponds to or equals the depth of tap threading desired. The nut member is turned to a position such that the retaining pin 22 is longitudinally aligned with one of the openings 17 in the sleeve 15, and the sleeve then projected or slid partially off the socket 14 to bring the end of the sleeve into engagement with the shoulder 20 of the nut member, the pin 22 entering the aperture 17 with which it was in longitudinal alignment, and thus holding the sleeve and nut member against disengagement. It will be appreciated that by reason of the non-circular cross sections of the socket 14 and the reduced end portion 18 of the nut member and the corresponding interior surface of the sleeve, the nut member is prevented from rotating relative to the socket, and therefore relative to the tap, so that it is held in its longitudinally adjusted position. At the same time, the sleeve is locked in its longitudinally projected position by engagement of the pin 22 in the aperture 17, so that the nut member cannot be unintentionally released by longitudinal movement of the sleeve therefrom. It will be apparent that the sliding movement of the sleeve into engagement with the nut member results in a radially inward camming movement of the pin 22 as the bevel surface 26 on the sleeve engages the angled surface 25 of the pin to overcome the spring 23, which again projects the pin outwardly as the aperture 17 comes into registration with the bore 21. Since six apertures 17 are provided in the sleeve, equally spaced circumferentially, the nut member may be brought to within 1/12 of the thread lead of the desired position, which for practical purposes is very accurate and precise.

Figure 1:
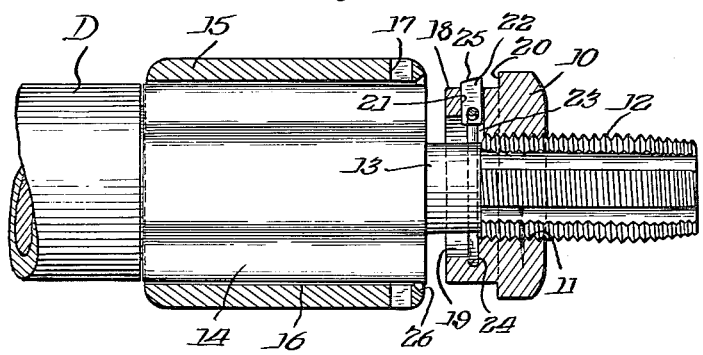
FIG. 1 is a side elevation of one embodiment of the invention in disengaged or adjustable condition, with parts in section for better illustrating the construction.
Figure 2:
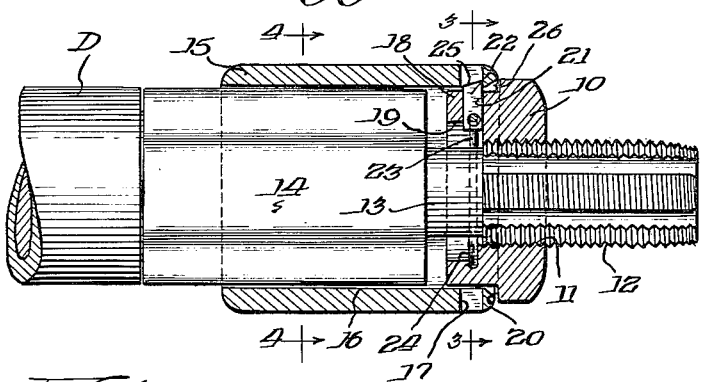
FIG. 2 is a view similar to FIG. 1, but showing the tap stop device in its adjusted locked or operative position.

The adjusting position of the nut member 10 and sleeve 15, or in other words the disengaged or separated condition thereof, is illustrated in FIG. 1, and the engaged condition of the sleeve and nut member, with the nut member locked in its adjusted position, is illustrated in FIG. 2. It will be seen from this figure that the shoulder 20 on the nut member provides a stop which by abutting engagement with the sleeve 15 prevents any possibility of the sleeve 15 being moved completely off the socket 14 and over and beyond the nut member 10. In this connection, also, it may be noted that the length of the sleeve 15 is such that it may simultaneously engage both the socket 14 and the reduced end portion 18 of the nut member when the nut member is in the adjusted position thereof most remote from the socket.

The shoulder 20, by being spaced from the radial bore 21 by substantially the same distance that the apertures 17 are spaced from the end edge of the sleeve 15, as shown, may serve as a positioning or locating means for the sleeve so as to assure registration of the appropriate aperture 17 with the bore 21 to receive the pin 22.

In use, after the nut member has been secured in the desired position as already described, the socket 14 is rotated with the threaded portion 12 of the tap engaged in the bore which is to be threaded, so that the tap is moved progressively in the bore in the usual manner. When the tap has threaded the bore for the desired distance, the nut member 10 comes into engagement with the surface through which the bore opens, and thus both indicates that the desired threading has been completed and prevents further penetration or inward movement of the tap, the friction between the nut member and work causing such an increase in the torque as either to effect the release or disconnection of the drive in the case of a torque release tap driver, or to prevent further rotation of the tap, when a manual tap wrench or socket is employed for driving the tap. It may here be pointed out that the drive of the tap is through the tap driver D and socket 14, and not through the sleeve 15 and nut member 10, the clearance 16 between the sleeve and socket providing sufficient play to avoid transmission of torque through the sleeve 15. The tap is then withdrawn from the bore, and may then be employed in the same manner on a similar bore to be tapped to the same depth as the first, and so on, if a plurality of bores are to be so tapped. If the tap is to be employed for through tapping in the usual manner, the tap stop device may readily be removed by applying any appropriate implement through the opening 17 against the end of the pin 21 to move it inwardly and allow the sleeve 15 to be withdrawn from the nut member, after which the nut member may be quickly spun off the tap and the sleeve removed from the socket. Similarly, when the nut member is to be moved to another adjusted position on the tap, the sleeve is disengaged from the nut member, which then is rotated to shift it longitudinally to the desired new position, and the sleeve is then again brought into engagement with the nut member, with the pin 22 engaging in one of the apertures 17 as already explained.

The radial bore 21 for the pin 22 is shown in the present case as located at an angle or high point of the generally hexagonal flange or wall of the reduced end portion 18, rather than at a substantially flat portion or side thereof. This results in a greater length of the bore 21, so as to provide greater stability for the pin 22 slidable therein, since the flange or wall is thicker at the angle or corner than at a side, due to the fact that the cylindrical inner surface of the portion 18 provided by the counterbore 19 approaches closer to the sides of the rounded hexagon than to the angles or corners, as will be obvious from FIG. 3. This permits nut blanks of a single size to be used to provide nut members for taps of a greater range of diameters, since the bore 11 may be made of a larger diameter without requiring the counterbore 19 to be of such large diameter as to result in so thin a flange or wall portion as not to provide proper guidance for or stability of the pin 22. In other words, the counterbore 19 may be of greater diameter when the radial bore 21 extends through the inherently and initially thicker wall portion at the angle of the hexagonal wall portion than if it extended through the side thereof.

Additional stability is given the detent by employing the shoulder defined by the end of the counterbore 19 as a guide and support for the spring ring 23 to retain the ring effectively engaged in the groove 24 despite its movements as the pin 22 is moved. The groove 24 is therefore formed at the end of the counterbore. The radial bore 21 for pin 22 is located with its axis substantially in the plane of the bottom of the counterbore, defining a radial groove therein which further guides the pin 22. This also allows the spring ring 23 to be connected to the pin in the plane of groove 24 so that it tends to return into the groove after deformation by pin movement.

It will of course be evident that if desired the socket 14 and reduced portion 18 may be of other polygonal formation than shown, or other non-circular section, with the interior of the sleeve 15 of course having a surface correspondingly formed, and also that instead of employing the non-circular construction to prevent relative rotation of the parts, other suitable means may be employed for this purpose, such as splines or keys, for example.

It will be appreciated that various changes and modifications, some of which have been described or suggested hereinabove, may be made in the illustrated embodiment of the invention without departing from the spirit and scope thereof, and that it is not intended to limit the invention otherwise than as required by the appended claims.

We claim:
1. Apparatus for tapping a thread in a bore for an adjustably limited distance inwardly from a surface through which the bore opens, comprising a driving socket having a non-circular cross-section, a tap carried by said socket, a nut member having a threaded bore for working on said tap to adjust to a position thereon longitudinally spaced from the tap end a distance equal to said limited distance, a reduced portion on the nut member end adjacent said socket having an exterior surface corresponding to said socket cross section and defining a socket-opposed shoulder on the nut member, a counterbore in said reduced end portion defining a wall portion on the nut member, an annular groove in the inner surface of said wall portion, an aperture extending radially through the wall portion in spaced relation to said shoulder, a pin slidably disposed in said aperture of a length greater than the thickness of the wall portion, a split resilient ring disposed in said groove and engaged with said pin biasing the pin to a position with an outer end projecting exteriorly of the wall portion, a sleeve on said socket having the interior surface thereof corresponding to said socket cross-section and reduced portion exterior surface of the nut member and slidable longitudinally partially off the socket for abutting engagement of one end with said nut member shoulder, a plurality of openings in said sleeve each spaced from said one end thereof not more than the spacing of said pin aperture from said shoulder each adapted to receive said projecting pin end therein upon said abutting engagement of the sleeve and shoulder for locking the sleeve against longitudinal movement relative to the nut member, and camming surfaces on said pin end and said one sleeve end cooperable upon sliding movement of the sleeve into engagement with the shoulder to move the pin radially inwardly to allow movement of the sleeve end therepast.

2. Apparatus for tapping a thread in a bore for an adjustably limited distance from an end of the bore, comprising a driving socket having a non-circular cross section, a tap carried by said socket, a nut member working on said tap for longitudinal adjustment to a position at a distance from the end of the tap corresponding to said limited distance, a reduced portion on the end of said nut member remote from said tap end providing a shoulder opposed to said socket and having a cross-section substantially identical to that of the socket, a sleeve disposed on said socket having an internal surface corresponding to said non-circular section and being slidable to a position with an end projecting longitudinally outwardly of the socket into encompassing engagement with said reduced nut member portion to hold the nut member against rotation and into movement-limiting abutting engagement with said shoulder, a radial aperture in said reduced portion opening exteriorly thereof, a retaining pin slidable in said aperture, spring means biasing said pin to a position projecting exteriorly of the reduced portion, and a plurality of circumferentially spaced pin-receiving openings in the sleeve adjacent said projecting end each adapted to have said pin engage therein upon sliding of the sleeve to said projecting position, whereby the sleeve is held against releasing separation from the nut member.

3. A device for adjustably limiting the effective length of a tap secured in a driving socket having a non-circular cross-section, comprising a nut member threadedly engageable on said tap for adjustment longitudinally thereof, a reduced portion on the nut member end adjacent said socket defining a socket-facing projection on the nut member and having an exterior surface corresponding to said socket cross-section, a counterbore in said reduced end portion defining a wall portion thereon, a radial aperture extending through said wall portion, a pin slidable in said aperture, an annular groove in the inner surface of the wall portion, a split spring ring disposed in said groove and engaged with the inner end of said pin biasing the pin to a position projecting outwardly of the wall portion, a sleeve having an interior configuration corresponding to both said socket cross-section and reduced portion exterior surface slidably engageable on the socket for simultaneously engaging the socket and the reduced end portion of the nut member to prevent nut member rotation relative to the tap, said nut member projection extending radially outward for abutting engagement with the adjacent end of said sleeve, a plurality of circumferentially spaced openings in said sleeve adjacent said abuttingly engageable end thereof each adapted to receive the outwardly projecting end of said pin therein to prevent disengagement of the sleeve from the nut member, and camming surfaces on the outer pin end and said engageable end of the sleeve cooperable upon sliding movement of the sleeve to said simultaneously engaging position to move the pin radially inwardly for allowing movement of said sleeve end therepast.

4. A device for adjustably limiting the effective length of a tap secured in a driving socket of non-circular cross-section, a nut member threadable on said tap for adjustable positioning thereof longitudinally of the tap and having a shoulder defined thereon by a reduced portion at the socket-adjacent end thereof, said reduced nut member portion having a cross-section substantially the same as that of the socket, a radial aperture in the reduced portion of the nut member opening to the exterior thereof, a detent pin slidably disposed in said aperture, spring means urging said pin outwardly to a position partially projecting exteriorly of the nut member, a sleeve slidably engaged on said socket having an interior surface thereof substantially corresponding to said socket and reduced portion section and also having a length to extend from said socket to said nut member shoulder in any position of the nut member on the tap with one end portion engaged on the socket and the other end engaged on said reduced portion and abutting said shoulder to prevent rotation of the nut member relative to the socket, and a plurality of peripherally spaced apertures in said sleeve adjacent said other end each adapted for selective engagement with said projected detent pin to prevent longitudinal separation of the sleeve and maintain the sleeve in position maintaining the nut member against rotation from its adjusted position on the tap.

5. A device for adjustably limiting the depth of penetration of a bore by a tap secured in a driving socket, comprising a nut member threadedly engageable on said tap for adjustment longitudinally thereof, a reduced portion of non-circular section on said nut member at the end thereof adjacent said socket, a shoulder on the nut member defined by said reduced portion, a radial aperture in the nut member, a retaining pin slidable in said aperture, means biasing said pin outwardly to a position with a nose portion thereof projecting outwardly from the nut member, a sleeve slidable on said socket in substantially non-rotatable relation and having an inner surface thereof substantially conforming to said non-circular section of the reduced nut member portion for encompassing and rotation-preventing engagement therewith, and a plurality of circumferentially spaced apertures in said sleeve adjacent the edge thereof adjacent the nut member each adapted to receive said nose portion of the pin upon longitudinal movement of said sleeve into said rotation-preventing engagement with said reduced nut member portion.

References Cited in the file of this patent

UNITED STATES PATENTS

| 389,335 | Spear | Sept. 11, 1888 |
| 1,068,211 | Bocorselski | July 22, 1913 |
| 2,546,387 | Coffing | Mar. 27, 1951 |

FOREIGN PATENTS

| 624,386 | Great Britain | June 7, 1949 |